(12) United States Patent
Banin et al.

(10) Patent No.: US 11,949,441 B2
(45) Date of Patent: Apr. 2, 2024

(54) TRANSMITTER AND METHOD FOR GENERATING RADIO FREQUENCY TRANSMIT SIGNAL, MOBILE DEVICE AND BASE STATION

(71) Applicant: Intel Corporation, Santa Clara, CA (US)

(72) Inventors: Elan Banin, Raanana (IL); Ofir Degani, Nes-Ammin (IL); Rotem Banin, Even-Yehuda (IL); Shahar Gross, Nes-Tziona (IL)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 16/936,456

(22) Filed: Jul. 23, 2020

(65) Prior Publication Data
US 2022/0029650 A1 Jan. 27, 2022

(51) Int. Cl.
*H04B 1/04* (2006.01)
*H04B 7/10* (2017.01)

(52) U.S. Cl.
CPC ............. *H04B 1/0475* (2013.01); *H04B 7/10* (2013.01); *H04B 2001/0491* (2013.01)

(58) Field of Classification Search
CPC .......... H04B 1/02; H04B 1/04; H04B 1/0475; H04B 1/10; H04B 1/38; H04B 1/30; H04B 2001/0408; H04B 2001/0425; H04B 2001/0491; H04L 27/20; H04L 27/2092; H04L 27/34
USPC .......... 375/146, 219, 22, 295-298; 332/103; 455/91, 114.2, 114.3
See application file for complete search history.

(56) References Cited

U.S. PATENT DOCUMENTS

| | | | |
|---|---|---|---|
| 5,850,390 A * | 12/1998 | Ramel | H04J 4/00 375/139 |
| 11,294,111 B1* | 4/2022 | Esman | H04B 10/2575 |
| 2007/0248184 A1* | 10/2007 | Plevridis | H03C 3/0908 375/296 |
| 2011/0188604 A1* | 8/2011 | Wagner | H03C 5/00 375/295 |

FOREIGN PATENT DOCUMENTS

CN 103219946 A * 7/2013 ............... H03C 5/00

* cited by examiner

*Primary Examiner* — Young T. Tse
(74) *Attorney, Agent, or Firm* — 2SPL Patent Attorneys PartG mbB; Yong Beom Hwang (57) ABSTRACT

A transmitter for generating a radio frequency, RF, transmit signal is provided. The transmitter includes signal generation circuitry configured to generate, based on a sequence of first control words each indicating a respective frequency shift with respect to a target frequency of the RF transmit signal, a RF carrier signal with sequentially varying frequency over time in order to frequency spread the RF transmit signal. Further, the transmitter includes modulation circuitry configured to generate the RF transmit signal by modulating the RF carrier signal with a modulation control signal. The transmitter additionally includes modification circuitry configured to generate the modulation control signal by modifying, based on the sequence of first control words, phase information of a baseband signal bearing information to be transmitted or phase information of a signal derived from the baseband signal in order to frequency de-spread the RF transmit signal.

25 Claims, 7 Drawing Sheets

TRANSMITTER AND METHOD FOR
GENERATING RADIO FREQUENCY
TRANSMIT SIGNAL, MOBILE DEVICE AND
BASE STATION

FIELD

The present disclosure relates to Radio Frequency (RF) signal generation. In particular, examples relate to a transmitter and a method for generating a RF transmit signal, a mobile device and a base station.

BACKGROUND

Due to impairments in the individual components of a transmitter, static and dynamic phase-related errors (e.g. Phase Modulation to Phase Modulation, PMPM, and Phase Modulation to Amplitude Modulation, PMAM) occur in the generated transmit signal. With calibration and correction, these errors can be reduced but not eliminated completely. The residual errors are usually small enough to meet Error-Vector-Magnitude (EVM) requirements, but they violate band-edge and spectrum mask requirements. Carrier-shifting can be used to shift the phase-errors and clear the band-edge. The problem with carrier-shifting is that the residual phase-error causes out-of-band spurs/lobes which violate the spectrum mask requirements.

Hence, there may be a desire for improved RF transmit signal generation.

BRIEF DESCRIPTION OF THE FIGURES

Some examples of apparatuses and/or methods will be described in the following by way of example only, and with reference to the accompanying figures, in which.

DETAILED DESCRIPTION

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Figure 1:
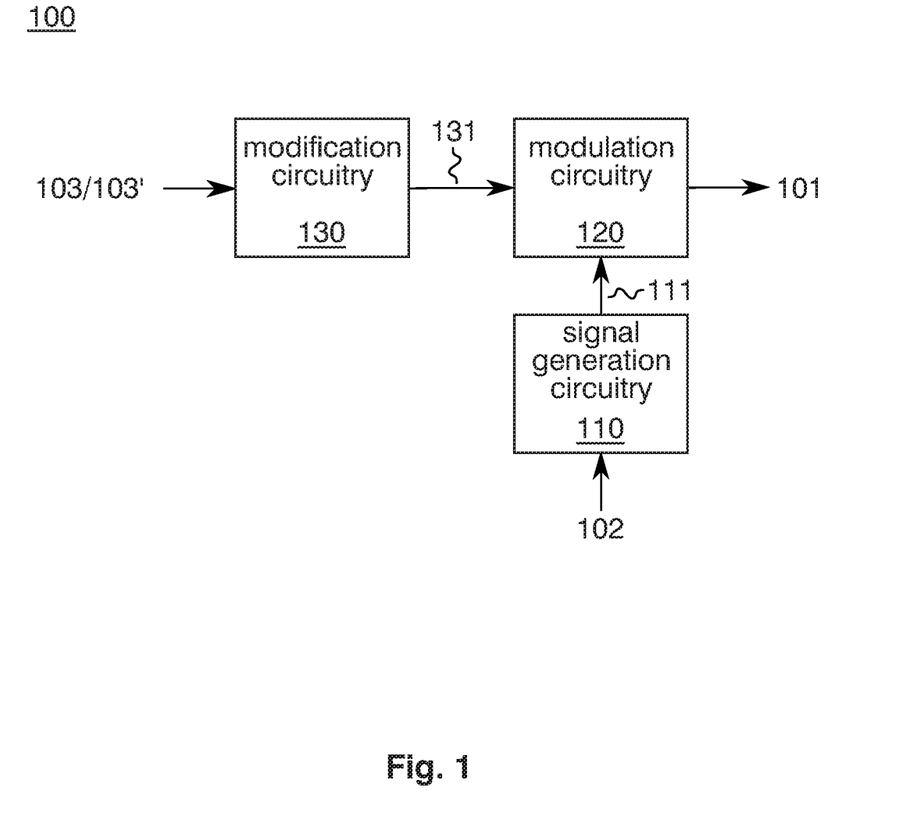
FIG. 1 illustrates a first example of a transmitter.

FIG. 1 illustrates a transmitter 100 for generating a RF transmit signal 101.

The transmitter 100 comprises signal generation circuitry 110 configured to generate a RF carrier signal 111 based on a (e.g. known/predefined/predetermined) sequence of first control words 102. Each first control word of the sequence of first control words 102 indicates a respective frequency shift with respect to a target (desired) frequency of the RF transmit signal 101. Accordingly, the RF carrier signal 111 exhibits a sequentially varying frequency over time which is frequency shifted with respect to the target frequency. In other words, the frequency of the RF carrier signal 111 varies successively/gradually over time for each first control word of the sequence of first control words 102. That is, the RF carrier signal 111 does not exhibit a constant frequency which is shifted with respect to the target frequency of the RF transmit signal 101. As an effect of the varying frequency of the RF carrier signal 111, the RF transmit signal 101 is frequency spread.

Further, the transmitter 100 comprises modulation circuitry 120 configured to generate the RF transmit signal 101 by modulating the RF carrier signal 111 with a modulation control signal 131. The modulation circuitry 120 may use any type of modulation such as, e.g., polar modulation or cartesian modulation (also known as "I/Q modulation").

The transmitter 100 additionally includes modification circuitry 130 configured to generate the modulation control signal 131. The modification circuitry 130 generates the modulation control signal 131 by modifying phase information of a baseband signal 103 based on the sequence of first control words 102. The baseband signal 103 bears (holds/indicates) information to be (wirelessly) transmitted (e.g. user data or configuration data). Alternatively, the modification circuitry 130 generates the modulation control signal 131 by modifying, based on the sequence of first control words 102, phase information of a signal 103' derived from the baseband signal 103. As an effect of the RF carrier signal modulation based on the modified phase information, the RF transmit signal 101 is frequency de-spread.

The transmitter 100 uses frequency spreading and de-spreading for generating the RF transmit signal 101. Shifting the frequency of the RF carrier signal 111 may allow to shift phase-errors out of a target frequency band for the RF transmit signal 101 and to clear the band-edge. The carrier-shift as such may cause out-of-band spurs/lobes in the RF transmit signal 101 due to residual phase-errors such that a spectrum mask for the RF transmit signal 101 may be violated. However, modulating the RF carrier signal 111 based on the modified phase information may allow to smear the residual errors and, hence, the out-of-band spurs/lobes in the RF transmit signal 101. Accordingly, the RF transmit signal 101 may be generated such that it meets band-edge and spectrum mask requirements.

For example, the RF transmit signal 101 may be a wideband signal with a signal bandwidth of at least 5, 10, 15, 20, 30, 40, 50, 60, 70, 80, 90, 100, 110, 120, 130, 140 or 150 MHz. In particular, the transmitter 100 may enable usage of carrier-shifting for signals with a bandwidth of less than 160 MHz without violating band-edge and spectrum mask requirements.

For example, the frequency shift over time as represented by the sequence of first control words 102 may exhibit a triangular shape, a sawtooth shape, a sinusoidal shape, a random shape or a pseudorandom shape. Accordingly, the course of the frequency of the RF carrier signal 111 over time may, e.g., correspond to (resemble) a triangular wave, a sawtooth wave, a sinusoidal wave, a random wave or a pseudorandom wave.

Although not explicitly illustrated in FIG. 1, the transmitter 100 may comprise additional circuitry (components). For example, the transmitter 100 may comprise sequence generation circuitry configured to generate the sequence of first control words 102. Additionally or alternatively, the transmitter 100 may comprise Power Amplifier (PA) circuitry configured to amplify the RF transmit signal 101.

Some exemplary transmitters showing further details of the proposed technique will be described in the following with reference to FIGS. 2 to 4.

Figure 2:
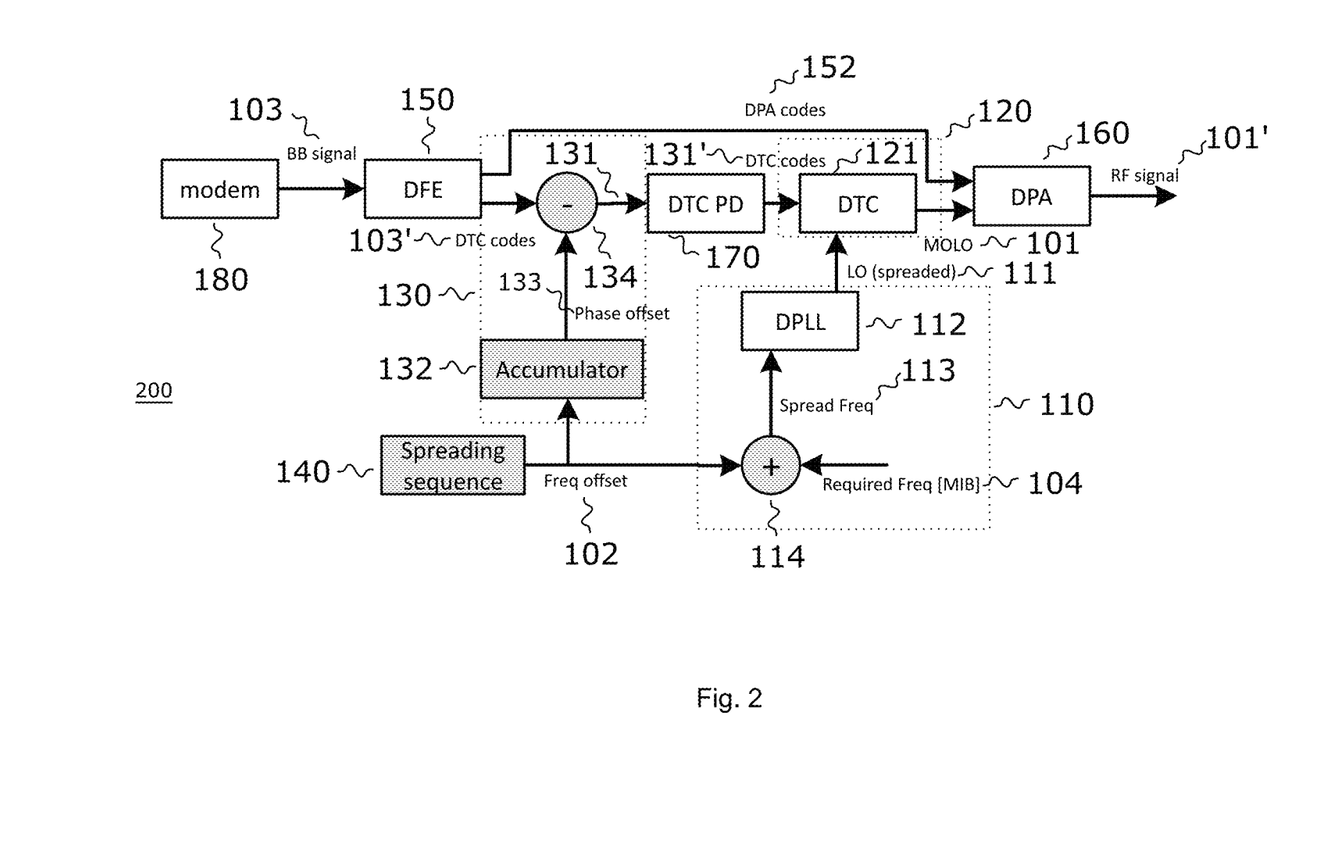
FIG. 2 illustrates a second example of a transmitter.

FIG. 2 illustrates an example of a digital polar transmitter 200 using RF transmit signal generation according to the proposed technique for generating a (e.g. wideband) RF transmit signal 101. The circuitry of the transmitter 200 is all digital circuitry.

The transmitter 200 comprises sequence generation circuitry 140 configured to generate a (e.g. known/predefined/predetermined) sequence of first control words 102. As described above, each first control word of the sequence of first control words 102 indicates a respective frequency shift with respect to a target (desired) frequency of the RF transmit signal 101.

Signal generation circuity 110 of the transmitter 200 generates a RF carrier signal 111 based on the sequence of first control words 102. The signal generation circuity 110 comprises Phase-Locked Loop (PLL) circuitry 112 (e.g. a digital PLL, DPLL) configured to generate the RF carrier signal 111 based on a sequence of PLL control words 113. Further, the signal generation circuity 100 110 comprises combining circuitry 114 (e.g. an adder circuit) configured to generate the sequence of PLL control words 113 by sequentially combining a second control word 104 with the sequence of first control words 102. The second control word 104 indicates the target frequency of the RF transmit signal 101. Accordingly, the sequence of PLL control words 113 indicates a sequentially varying frequency over time for the RF transmit signal 101. As a consequence, the PLL circuitry 112 generates the RF carrier signal 111 with a gradually varying frequency over time.

Modulation circuitry 120 of the transmitter 200 comprises a Digital-to-Time Converter (DTC) circuit 121 for modulating the RF carrier signal 111 based on information to be (wirelessly) transmitted. Due to the gradually varying frequency over time of the RF carrier signal 111, the resulting RF transmit signal 101 is frequency spread.

Modem circuitry 180 provides (supplies) a baseband signal 103 bearing the information to be (wirelessly) transmitted to the transmitter 200.

Front-end circuitry 150 (e.g. a Digital Front-End, DFE) of the transmitter 200 is configured to derive a signal 103' from the baseband signal 103. The signal 103' indicates an unmodified sequence of control words for the DTC circuit 121. The front-end circuitry 150 is configured to generate the unmodified sequence of control words for the DTC circuit 121 based on the phase information of the baseband signal 103. In other words, the front-end circuitry 150 translates the phase information of the baseband signal 103 to control words for the DTC circuit 121. Accordingly, a code ramp for the DTC 121, which corresponds to the phase information of the baseband signal 103, may be generated.

Modification circuitry 130 of the transmitter 200 receives the signal 103' indicating the unmodified sequence of control words for the DTC circuit 121. The modification circuitry 130 comprises combining circuitry 134 (e.g. an adder circuit) configured to generate a (modified) sequence of control words for the DTC circuit 121 by sequentially combining the unmodified sequence of control words for the DTC circuit 121 with a sequence of shift words 133. Further, the modification circuitry 130 comprises accumulator circuitry 132 configured to generate the sequence of shift words 133 by sequentially accumulating the sequence of first control words 102. The modification circuitry 130 outputs a modulation control signal 131 which indicates the (modified) sequence of control words for the DTC circuit 121. By sequentially combining the unmodified sequence of control words for the DTC circuit 121 with the sequence of shift words 133, the code ramp for the DTC 121 may be scrambled based on the sequence of first control words 102. The scrambling of the code ramp for the DTC 121 effectively frequency de-spreads the RF transmit signal 101 generated by the DTC circuit 121. In particular, the scrambling of the code ramp for the DTC 121 may allow to smear residual phase-errors and, hence, out-of-band spurs/lobes in the RF transmit signal 101 over a wider frequency range. Accordingly, the RF transmit signal 101 may be generated such that it meets band-edge and spectrum mask requirements.

In other words, the transmitter 200 uses frequency spreading and de-spreading in order to smear out-of-band spurs with carrier-shift. In the example of FIG. 2, this is done by injecting a known frequency-offset sequence 102 into the PLL circuitry 122 and applying the inverse sequence in the DTC circuit 121. In particular, an offset sequence 102 is added to the DPLL frequency word 104. The same sequence 102 is accumulated in order to produce the phase correction 133 which is added to the DTC codes indicated by the signal 103'.

As illustrated in FIG. 2, the transmitter 200 may optionally further use pre-distortion for the control words for the DTC circuit 121. The transmitter 200 comprises pre-distortion circuitry 170 coupled between the modification circuitry 130 and the modulation circuitry 120. The pre-distortion circuitry 170 is configured to pre-distort the (modified) sequence of control words for the DTC circuit 121 in the modulation control signal 131. The pre-distortion circuitry 170 outputs a pre-distorted modulation control signal 131' to the modulation circuitry 120, which indicates the pre-distorted sequence of control words for the DTC circuit 121. For example, pre-distortion may be used for correcting an Integral Non-Linearity (INL) of the DTC circuit 121. In other words, pre-distortion may be done after the addition of the de-spreading codes 133 to the code ramp for the DTC 121. The proposed usage of frequency spreading and de-spreading may further reduce the requirements for calibrating the DTC circuit 121. In other words, DTC calibration may be facilitated.

The transmitter 200 may optionally further comprise PA circuitry 160 (e.g. a Digital PA, DPA, circuit) for amplifying the RF transmit signal 101. In the example of FIG. 2, the PA circuitry 160 is configured to amplify the RF transmit signal 101 based on a sequence of amplification control words 152. The front-end circuitry 150 is configured to generate the sequence of amplification control words 150 for the PA circuitry 160 based on the baseband signal 103 (e.g. based on amplitude/radius information of the baseband signal 103). The PA circuitry 160 outputs the amplified RF transmit signal 101'.

The transmitter 200 may enable to generate the RF transmit signal 101 such that it meets band-edge and spectrum mask requirements.

Figure 3:
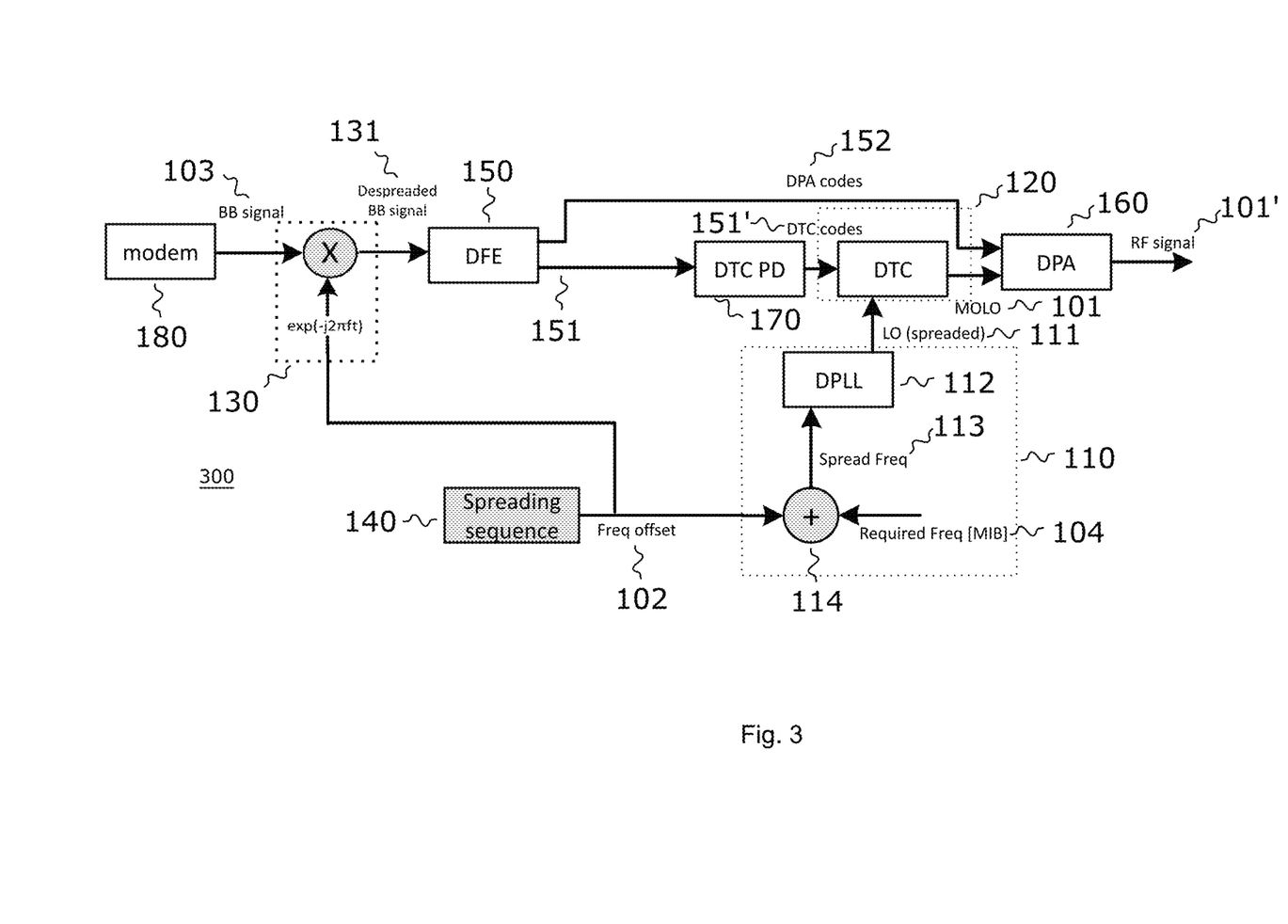
FIG. 3 illustrates a third example of a transmitter.

Another example of a digital polar transmitter 300 using RF transmit signal generation according to the proposed technique for generating a (e.g. wideband) RF transmit signal 101 is illustrated in FIG. 3. The transmitter 300 is similar to the transmitter 200 described above, only the frequency de-spreading is done in a different manner. Therefore, mainly the differences between the transmitter 300 and the transmitter 200 will be described in the following with reference to FIG. 3.

In the example of FIG. 3, the frequency de-spreading is applied directly to the baseband signal 103. In particular, the modification circuitry 130 of the transmitter 300 is configured to sequentially modify the phase information of the baseband signal 103 based on the sequence of first control words 102 in order to generate the modulation control signal 131. For example, the modification circuitry 130 may comprise a multiplier circuit configured to sequentially multiply the phase information of the baseband signal 103 with a phase term related to the respective frequency shift indicated by each first control word of the sequence of first control words 102. As indicated in FIG. 3, the phase information of the baseband signal 103 may, e.g., be sequentially multiplied with the phase term wherein f denotes the respective frequency shift indicated by each first control word of the sequence of first control words 102.

Accordingly, the front-end circuitry 150 of the transmitter 300 is configured to generate a sequence of control words for the DTC circuit 121 based on the modulation control signal 131 indicating the modified phase information of the baseband signal 103. The front-end circuitry 150 outputs a signal 151 indicating the sequence of control words for the DTC circuit 121. By sequentially modifying the phase information of the baseband signal 103 based on the sequence of first control words 102, the code ramp for the DTC 121 may be scrambled based on the sequence of first control words 102. Analogously to what is described above, the scrambling of the code ramp for the DTC 121 may allow to smear residual phase-errors and, hence, out-of-band spurs/lobes in the RF transmit signal 101 over a wider frequency range. Accordingly, the RF transmit signal 101 may be generated such that it meets band-edge and spectrum mask requirements.

Also, the transmitter 300 may optionally further use pre-distortion for the control words for the DTC circuit 121. The transmitter 200 comprises pre-distortion circuitry 170 coupled between the modification circuitry 130 and the modulation circuitry 120. The pre-distortion circuitry 170 is configured to pre-distort the sequence of control words for the DTC circuit 121 in the signal 151. The pre-distortion circuitry 170 outputs a pre-distorted signal 151' to the modulation circuitry 120, which indicates the pre-distorted sequence of control words for the DTC circuit 121.

Similar to what is described above, the transmitter 300 may optionally comprise PA circuitry 160 for amplifying the RF transmit signal 101. In the example of FIG. 3, the front-end circuitry 150 is configured to generate the sequence of amplification control words 152 for the PA circuitry 160 based on the modulation control signal 131 derived from the baseband signal 103 (i.e. also in the example of FIG. 3, the sequence of amplification control words 152 for the PA circuitry 160 is effectively generated based on the baseband signal 103).

The transmitter 300 may enable to generate the RF transmit signal 101 such that it meets band-edge and spectrum mask requirements.

Figure 4:
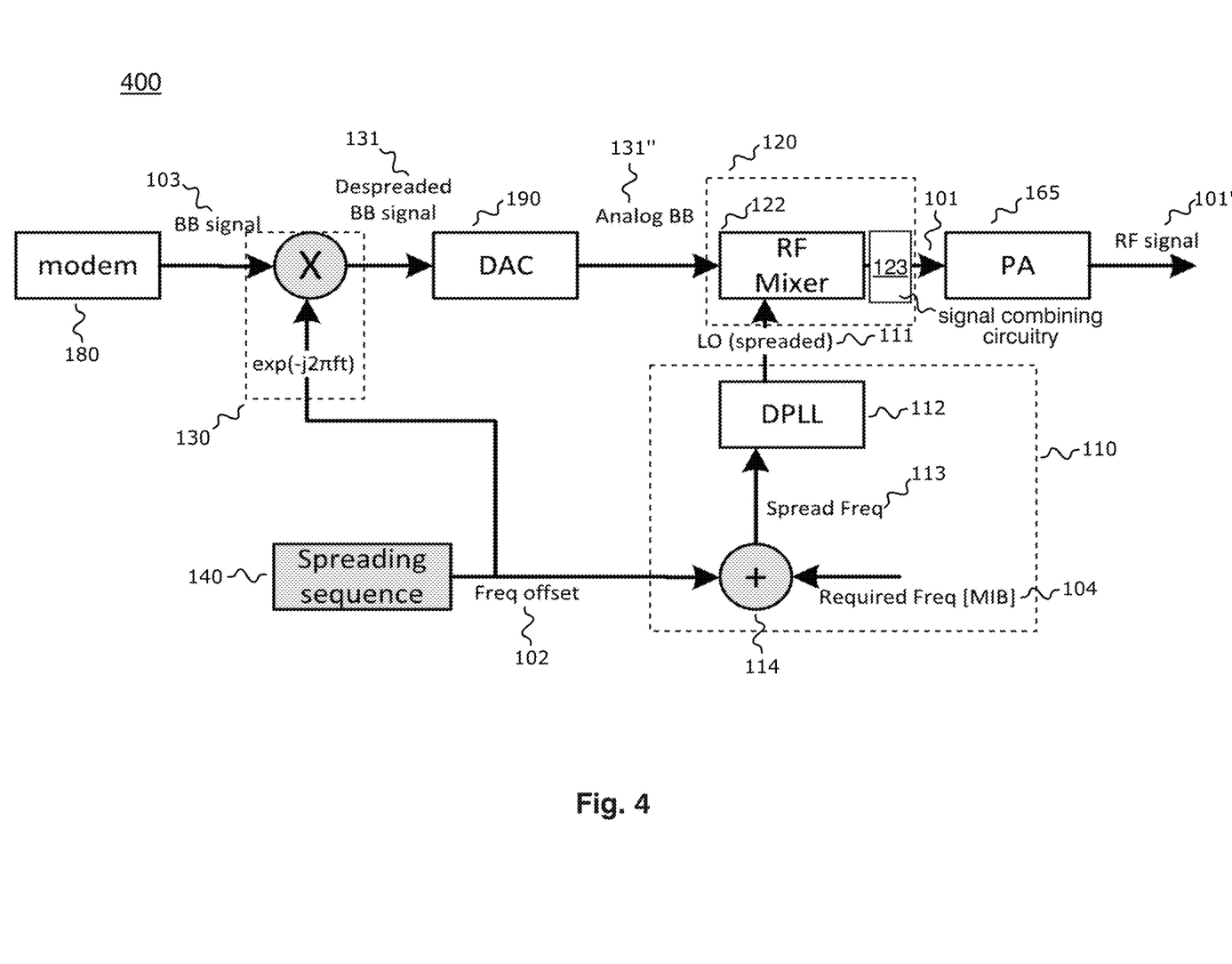
FIG. 4 illustrates a fourth example of a transmitter.

FIG. 4 illustrates an example of an analog cartesian (I/Q) transmitter 400 using RF transmit signal generation according to the proposed technique for generating a (e.g. wideband) RF transmit signal 101. The circuitry of the transmitter 400 is a mixture of digital and analog circuitry.

Similarly to the above described transmitters, also the transmitter 400 comprises sequence generation circuitry 140 configured to generate a (e.g. known/predefined/predetermined) sequence of first control words 102. As described above, each first control word of the sequence of first control words 102 indicates a respective frequency shift with respect to a target (desired) frequency of the RF transmit signal 101.

Signal generation circuity 110 of the transmitter 400 generates a RF carrier signal 111 based on the sequence of first control words 102 similarly to what is described above. The signal generation circuitry 110 comprises PLL circuitry 112 (e.g. a DPLL) configured to generate the RF carrier signal 111 based on a sequence of PLL control words 113. Further, the signal generation circuitry 100 110 comprises combining circuitry 114 (e.g. an adder circuit) configured to generate the sequence of PLL control words 113 by sequentially combining a second control word 104 with the sequence of first control words 102. The second control word 104 indicates the target frequency of the RF transmit signal 101. Accordingly, the sequence of PLL control words 113 indicates a sequentially varying frequency over time for the RF transmit signal 101. As a consequence, the PLL circuitry 112 generates the RF carrier signal 111 with a gradually varying frequency over time.

Modulation circuitry 120 of the transmitter 400 comprises a mixer circuitry 122 for modulating the RF carrier signal 111 based on information to be (wirelessly) transmitted. Due to the gradually varying frequency over time of the RF carrier signal 111, the resulting RF transmit signal 101 is frequency spread.

Modem circuitry 180 provides (supplies) a baseband signal 103 bearing the information to be (wirelessly) transmitted to the transmitter 400. The baseband signal 103 comprises an in-phase component I and a quadrature component Q.

Modification circuitry 130 of the transmitter 400 receives the baseband signal 103. The modification circuitry 130 is configured to sequentially modify the respective phase information of the I component and the Q component of the baseband signal 103 based on the sequence of first control words 102 in order to generate a modified in-phase component I' and a modified quadrature component Q' of the baseband signal 103. For example, the modification circuitry 130 may comprise a multiplier circuit configured to sequentially multiply the respective phase information of the in-phase component I and the quadrature component Q of the baseband signal 103 with a phase term related to the respective frequency shift indicated by each first control word of the sequence of first control words 102. As indicated in FIG. 4, the respective phase information of the in-phase component I and the quadrature component Q of the baseband signal 103 may, e.g., be sequentially multiplied with the phase term $e^{-j2\pi ft}$, wherein f denotes the respective frequency shift indicated by each first control word of the sequence of first control words 102. The baseband signal with the modified in-phase component I' and the modified quadrature component Q' is used as a modulation control signal 131 for the modulation circuitry 120.

In particular, the mixer circuitry 122 is configured to generate a first component of the RF transmit signal 101 by modulating the RF carrier signal 111 with (based on) the modified in-phase component I' of the baseband signal. Further, the mixer circuitry 122 is configured to generate a second component of the RF transmit signal 101 by modulating a 90° phase shifted replica of the RF carrier signal 111 with (based on) the modified quadrature component Q' of the baseband signal. For example, the mixer circuitry 122 may comprise a phase-shifter circuit for generating the 90° phase shifted replica of the RF carrier signal 111 based on the RF carrier signal 111. Alternatively, a separate (external) phase-shifter circuit of the transmitter 400 may be used to generate the 90° phase shifted replica of the RF carrier signal 111 based on the RF carrier signal 111.

Signal combining circuitry 123 (e.g. an adder circuit) of the modulation circuitry 120 is configured to generate the RF transmit signal 101 by combining the first component of the RF transmit signal 101 and the second component of the RF transmit signal 102 101.

Similarly to what is described above, the sequential modification of the respective phase information of the in-phase component I and the quadrature component Q of the baseband signal 103 based on the sequence of first control words 102 causes a frequency de-spread of the RF transmit signal 101. The modification of the respective phase information of the in-phase component I and the quadrature component Q of the baseband signal 103 may allow to smear residual phase-errors and, hence, out-of-band spurs/lobes in the RF transmit signal 101 over a wider frequency range. Accordingly, the RF transmit signal 101 may be generated such that it meets band-edge and spectrum mask requirements.

As illustrated in FIG. 4, the modulation control signal 131 may be converted to the analog domain before it is fed to the modulation circuitry 120. The transmitter 400 comprises Digital-to-Analog Converter (DAC) circuitry 190 coupled between the modification circuitry 130 and the modulation circuitry 120. The DAC circuitry 190 is configured to convert the modulation control signal 131 to the analog domain. The resulting analog modulation control signal 131" is then supplied to the modulation circuitry 120.

The transmitter 400 may optionally further comprise PA circuitry 165 configured to amplify the RF transmit signal 101. The PA circuitry 165 outputs the amplified RF transmit signal 101'.

Figure 5:
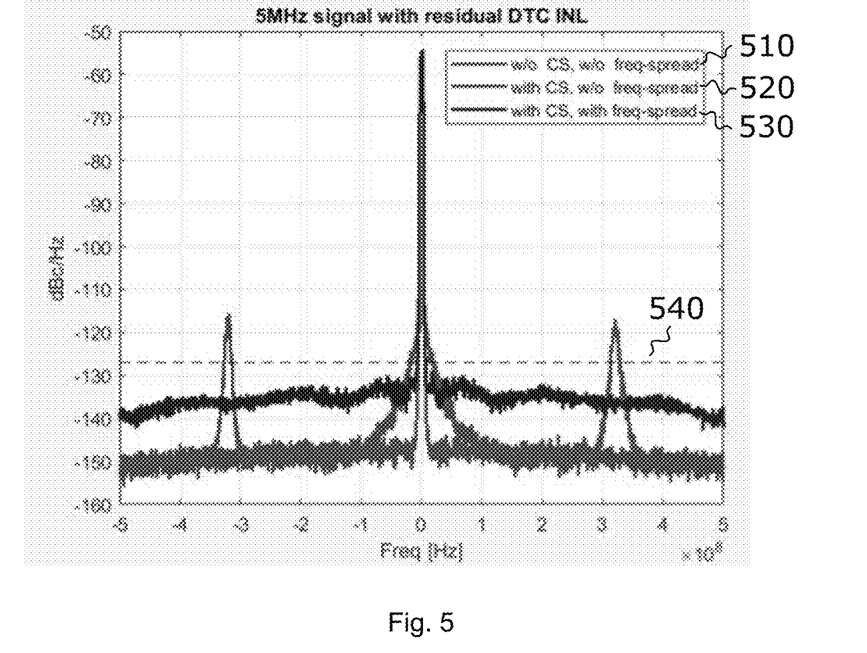
FIG. 5 illustrates a first comparison of exemplary RF transmit signals.
Figure 6:
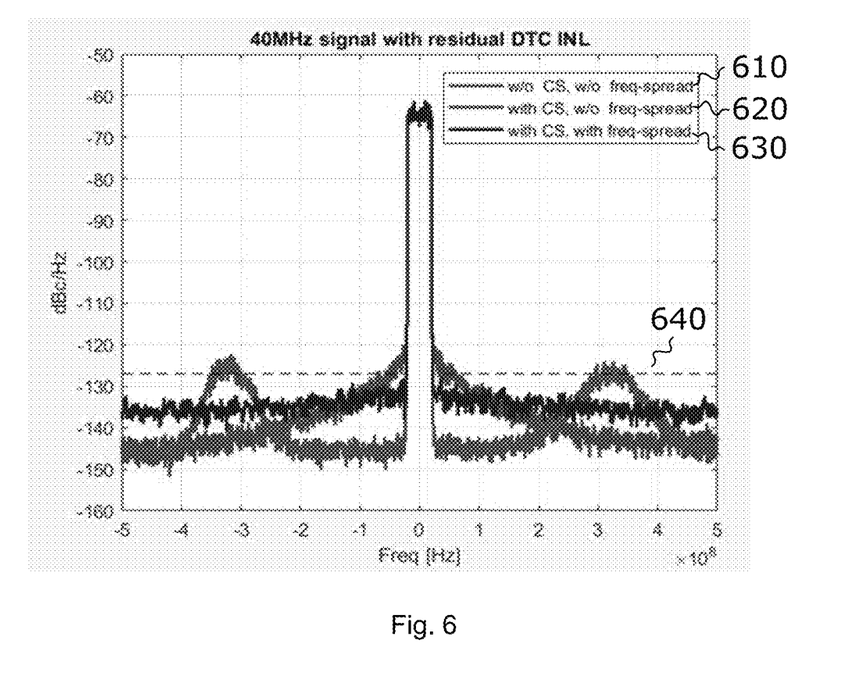
FIG. 6 illustrates a second comparison of exemplary RF transmit signals.

The effect of the RF transmit signal generation according to one or more aspects of the architecture described above in connection with FIGS. 1 to 4 is illustrated in FIGS. 5 and 6. FIG. 5 illustrates the respective Power Spectral Density (PSD) of three different RF transmit signals 510, 520 and 530, each exhibiting a bandwidth of 5 MHz.

The RF transmit signal 510 is generated conventionally. As can be seen from FIG. 5, phase-errors in the conventional signal generation cause unwanted signal components at the band edge. The RF transmit signal 510 does not meet the requirements of the exemplary spectrum mask 540.

The RF transmit signal 520 is generated conventionally using carrier-shifting. As can be seen from FIG. 5, the band edge improves significantly. However, side lobes are emerging. Therefore, also the RF transmit signal 520 does not meet the requirements of the exemplary spectrum mask 540.

The RF transmit signal 530 is generated according to the propose technique. That is, frequency spreading and de-spreading is used for generating the RF transmit signal 530. As can be seen from FIG. 5, the energy of the side lobes is smeared across the spectrum such that the RF transmit signal 530 meets the requirements of the exemplary spectrum mask 540.

FIG. 6 illustrates the respective PSD of three different RF transmit signals 610, 620 and 630, each exhibiting a bandwidth of 40 MHz.

The RF transmit signal 610 is generated conventionally. As can be seen from FIG. 6, phase-errors in the conventional signal generation cause unwanted signal components at the band edge. The RF transmit signal 610 does not meet the requirements of the exemplary spectrum mask 640.

The RF transmit signal 620 is generated conventionally using carrier-shifting. As can be seen from FIG. 6, the band edge improves significantly. However, side lobes are emerging. Therefore, also the RF transmit signal 620 does not meet the requirements of the exemplary spectrum mask 640.

The RF transmit signal 630 is generated according to the propose technique. That is, frequency spreading and de-spreading is used for generating the RF transmit signal 630. As can be seen from FIG. 6, the energy of the side lobes is smeared across the spectrum such that the RF transmit signal 630 meets the requirements of the exemplary spectrum mask 640.

As can be seen from FIGS. 5 and 6, the proposed technique for RF transmit signal generation may enable improved RF transmit signal generation.

Figure 7:
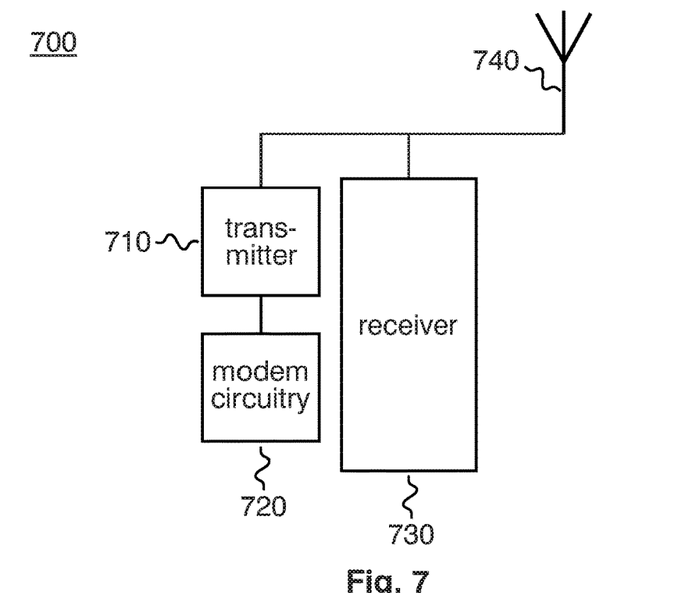
FIG. 7 illustrates an example of a base station.

An example of an implementation using RF transmit signal generation according to one or more aspects of the architecture described above in connection with FIGS. 1 to 4 or one or more examples described above in connection with FIGS. 1 to 4 is illustrated in FIG. 7. FIG. 7 schematically illustrates an example of a radio base station 700 (e.g. for a femtocell, a picocell, a microcell or a macrocell) comprising a transmitter 710 as proposed.

The base station 700 additionally comprises modem circuitry 720 (e.g. comprising a baseband processor) configured to generate the baseband signal based on the information to be (wirelessly) transmitted. The transmitter is coupled to the modem circuitry 720.

The base station 700 comprises at least one antenna element 740 coupled to the transmitter 710 for radiating the RF transmit signal to the environment. For example, the transmitter 710 may be coupled to the antenna element 740 via one or more intermediate elements such as a filter, an up-converter (mixer) or a PA.

Additionally, the base station 700 comprises a receiver 730 configured to receive a RF receive signal from the antenna element 740 or another antenna element (not illustrated) of the base station 700.

To this end, a base station with improved RF transmit signal generation may be provided.

The base station 700 may comprise further elements such as, e.g., an application processor, memory, a network controller, a user interface, power management circuitry, a satellite navigation receiver, a network interface controller or power tee circuitry.

In some aspects, the application processor may include one or more Central Processing Unit CPU cores and one or more of cache memory, a Low-DropOut (LDO) voltage regulator, interrupt controllers, serial interfaces such as Serial Peripheral Interface (SPI), Inter-Integrated Circuit (I²C) or universal programmable serial interface module, Real Time Clock (RTC), timer-counters including interval and watchdog timers, general purpose Input-Output (IO), memory card controllers such as Secure Digital (SD)/MultiMedia Card (MMC) or similar, Universal Serial Bus (USB) interfaces, Mobile Industry Processor Interface Alliance (MIPI) interfaces and Joint Test Access Group (JTAG) test access ports.

In some aspects, the baseband processor may be implemented, for example, as a solder-down substrate including one or more integrated circuits, a single packaged integrated circuit soldered to a main circuit board or a multi-chip module containing two or more integrated circuits.

In some aspects, the memory may include one or more of volatile memory including Dynamic Random Access Memory (DRAM) and/or Synchronous Dynamic Random Access Memory (SDRAM), and Non-Volatile Memory (NVM) including high-speed electrically erasable memory (commonly referred to as Flash memory), Phase change Random Access Memory (PRAM), Magnetoresistive Random Access Memory (MRAM) and/or a three-dimensional crosspoint (3D XPoint) memory. The memory may be implemented as one or more of solder down packaged integrated circuits, socketed memory modules and plug-in memory cards.

In some aspects, the power management integrated circuitry may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, the power tee circuitry may provide for electrical power drawn from a network cable to provide both power supply and data connectivity to the base station using a single cable.

In some aspects, the network controller may provide connectivity to a network using a standard network interface protocol such as Ethernet. Network connectivity may be provided using a physical connection which is one of electrical (commonly referred to as copper interconnect), optical or wireless.

In some aspects, the satellite navigation receiver module may include circuitry to receive and decode signals transmitted by one or more navigation satellite constellations such as the Global Positioning System (GPS), GLObalnaya NAvigatSionnaya Sputnikovaya Sistema (GLONASS), Galileo and/or BeiDou. The receiver may provide data to the application processor which may include one or more of position data or time data. The application processor may use time data to synchronize operations with other radio base stations.

In some aspects, the user interface may include one or more of physical or virtual buttons, such as a reset button, one or more indicators such as Light Emitting Diodes (LEDs) and a display screen.

Figure 8:
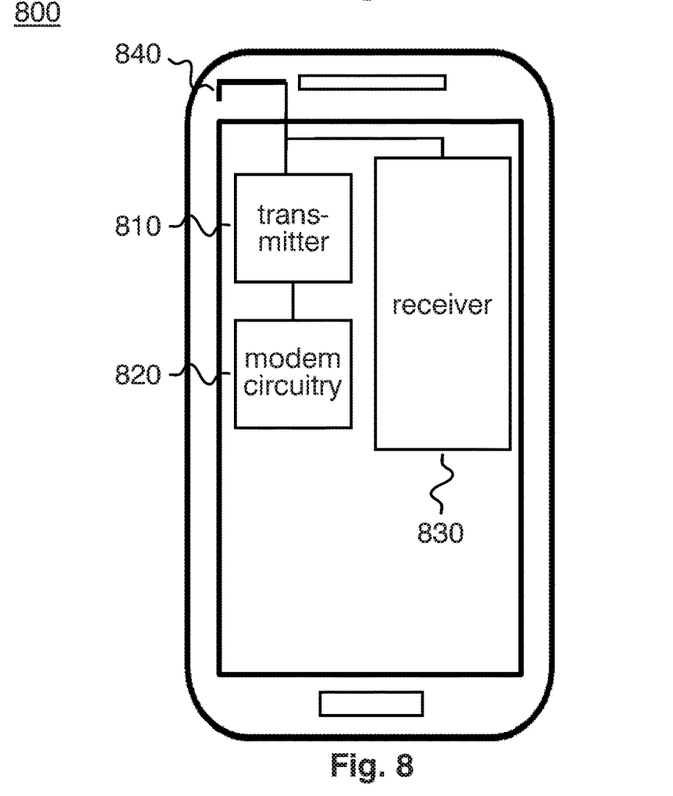
FIG. 8 illustrates an example of a mobile device.

Another example of an implementation using RF transmit signal generation according to one or more aspects of the architecture described above in connection with FIGS. 1 to 4 or one or more examples described above in connection with FIGS. 1 to 4 is illustrated in FIG. 8. FIG. 8 schematically illustrates an example of a mobile device 800 (e.g. mobile phone, smartphone, tablet-computer, or laptop) comprising a transmitter 810 as proposed.

The mobile device 800 additionally comprises modem circuitry 820 (e.g. comprising a baseband processor) configured to generate the baseband signal based on the information to be (wirelessly) transmitted. The transmitter is coupled to the modem circuitry 820.

The mobile device 800 comprises at least one antenna element 840 coupled to the transmitter 810 for radiating the RF transmit signal to the environment. For example, the transmitter 810 may be coupled to the antenna element 840 via one or more intermediate elements such as a filter, an up-converter (mixer) or a PA.

Additionally, the mobile device 800 comprises a receiver 830 configured to receive a RF receive signal from the antenna element 840 or another antenna element (not illustrated) of the mobile device 800.

To this end, a mobile device with improved RF transmit signal generation may be provided.

The mobile device 800 may comprise further elements such as, e.g., a baseband processor, memory, a connectivity module, a Near Field Communication (NFC) controller, an audio driver, a camera driver, a touch screen, a display driver, sensors, removable memory, a power management integrated circuit or a smart battery.

In some aspects, the application processor may include, for example, one or more CPU cores and one or more of cache memory, LDO regulators, interrupt controllers, serial interfaces such as SPI, I²C or universal programmable serial interface module, RTC, timer-counters including interval and watchdog timers, general purpose input-output (IO), memory card controllers such as SD/MMC or similar, USB interfaces, MIPI interfaces and JTAG test access ports.

In some aspects, the baseband module may be implemented, for example, as a solder-down substrate including one or more integrated circuits, a single packaged integrated circuit soldered to a main circuit board, and/or a multi-chip module containing two or more integrated circuits.

The wireless communication circuits using RF transmit signal generation according to the proposed architecture or one or more of the examples described above may be configured to operate according to one of the 3GPP-standardized mobile communication networks or systems. The mobile or wireless communication system may correspond to, for example, a 5th Generation New Radio (5G NR), a Long-Term Evolution (LTE), an LTE-Advanced (LTEA), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM), an Enhanced Data rates for GSM Evolution (EDGE) network, or a GSM/EDGE Radio Access Network (GERAN). Alternatively, the wireless communication circuits may be configured to operate according to mobile communication networks with different standards, for example, a Worldwide Interoperability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

For further illustrating the RF transmit signal generation described above, FIG. 9 illustrates a flowchart of a method 900 for generating a RF transmit signal. The method 900 comprises generating 902, based on a sequence of first control words each indicating a respective frequency shift with respect to a target frequency of the RF transmit signal, a RF carrier signal with sequentially varying frequency over time in order to frequency spread the RF transmit signal. Further, the method 900 comprises generating 904 the RF transmit signal by modulating the RF carrier signal with a modulation control signal. The method additionally comprises generating 906 the modulation control signal by modifying, based on the sequence of first control words, phase information of a baseband signal bearing information to be transmitted or phase information of a signal derived from the baseband signal in order to frequency de-spread the RF transmit signal.

Figure 9:
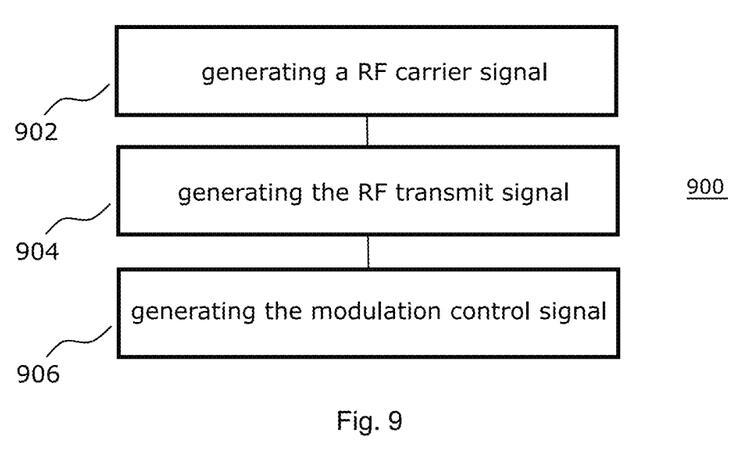
FIG. 9 illustrates a flowchart of an example of a method for generating a RF transmit signal.

The method 900 may allow generation of an RF transmit signals that matches band-edge and spectrum mask requirements. Accordingly, the method 900 may enable improved RF transmit signal generation.

More details and aspects of the method 900 are explained in connection with the proposed technique or one or more examples described above (e.g. FIGS. 1 to 4). The method 900 may comprise one or more additional optional features corresponding to one or more aspects of the proposed technique or one or more examples described above.

The examples described herein may be summarized as follows:

What is claimed is:

Example 1 is a transmitter for generating a radio frequency, RF, transmit signal, comprising: signal generation circuitry configured to generate, based on a sequence of first control words each indicating a respective frequency shift with respect to a target frequency of the RF transmit signal, a RF carrier signal with sequentially varying frequency over time in order to frequency spread the RF transmit signal; modulation circuitry configured to generate the RF transmit signal by modulating the RF carrier signal with a modulation control signal; and modification circuitry configured to generate the modulation control signal by modifying, based on the sequence of first control words, phase information of a baseband signal bearing information to be transmitted or phase information of a signal derived from the baseband signal in order to frequency de-spread the RF transmit signal.

Example 2 is the transmitter of example 1, wherein the signal generation circuitry comprises: phase-locked loop circuitry configured to generate the RF carrier signal based on a sequence of phase-locked loop control words; and combining circuitry configured to generate the sequence of phase-locked loop control words by sequentially combining a second control word indicating the target frequency of the RF transmit signal with the sequence of first control words.

Example 3 is the transmitter of example 1 or example 2, further comprising sequence generation circuitry configured to generate the sequence of first control words.

Example 4 is the transmitter of any of examples 1 to 3, wherein the modulation circuitry is configured to generate the RF transmit signal using polar modulation.

Example 5 is the transmitter of any of examples 1 to 4, wherein the modulation circuitry comprises a digital-to-time converter circuit, and wherein the modulation control signal indicates a sequence of control words for the digital-to-time converter circuit.

Example 6 is the transmitter of example 5, wherein the signal derived from the baseband signal indicates an unmodified sequence of control words for the digital-to-time converter circuit, and wherein the modification circuitry comprises: combining circuitry configured to generate the sequence of control words for the digital-to-time converter circuit by sequentially combining the unmodified sequence of control words for the digital-to-time converter circuit with a sequence of shift words; and accumulator circuitry configured to generate the sequence of shift words by sequentially accumulating the sequence of first control words.

Example 7 is the transmitter of example 6, further comprising front-end circuitry configured to generate the unmodified sequence of control words for the digital-to-time converter circuit based on the phase information of the baseband signal.

Example 8 is the transmitter of any of examples 1 to 4, wherein the modulation circuitry comprises a digital-to-time converter circuit, wherein the modification circuitry is configured to sequentially modify the phase information of the baseband signal based on the sequence of first control words in order to generate the modulation control signal, and wherein the transmitter further comprises front-end circuitry configured to generate a sequence of control words for the digital-to-time converter circuit based on the modulation control signal.

Example 9 is the transmitter of example 7 or example 8, wherein the transmitter further comprises power amplifier circuitry configured to amplify the RF transmit signal based on a sequence of amplification control words, and wherein the front-end circuitry is further configured to generate the sequence of amplification control words for the power amplifier circuitry based on the baseband signal.

Example 10 is the transmitter of any of examples 6 to 9, further comprising pre-distortion circuitry coupled between the modification circuitry and the modulation circuitry, wherein the pre-distortion circuitry is configured to pre-distort the sequence of control words for the digital-to-time converter circuit.

Example 11 is the transmitter of any of examples 4 to 10, wherein circuitry of the transmitter is digital circuitry.

Example 12 is the transmitter of any of examples 1 to 3, wherein the modulation circuitry is configured to generate the RF transmit signal using cartesian modulation.

Example 13 is the transmitter of any of examples 1, 2, 3 or 12, wherein the modification circuitry is configured to sequentially modify the respective phase information of an in-phase component and a quadrature component of the baseband signal based on the sequence of first control words in order to generate a modified in-phase component and a modified quadrature component of the baseband signal as the modulation control signal, and wherein the modulation circuitry comprises: mixer circuitry configured to: generate a first component of the RF transmit signal by modulating the RF carrier signal with the modified in-phase component of the baseband signal; and generate a second component of the RF transmit signal by modulating a 90° phase shifted replica of the RF carrier signal with the modified quadrature component of the baseband signal; and signal combining circuitry configured to generate the RF transmit signal by combining the first component of the RF transmit signal and the second component of the RF transmit signal.

Example 14 is the transmitter of example 13, further comprising digital-to-analog converter circuitry coupled between the modification circuitry and the modulation circuitry, wherein the digital-to-analog converter circuitry is configured to convert the modulation control signal to the analog domain.

Example 15 is the transmitter of example 13 or example 14, further comprising power amplifier circuitry configured to amplify the RF transmit signal.

Example 16 is the transmitter of any of examples 1 to 15, wherein the RF transmit signal is a wideband signal.

Example 17 is a mobile device, comprising: a transmitter according to any of examples 1 to 16; and modem circuitry configured to generate the baseband signal based on the information to be transmitted.

Example 18 is the mobile device of example 17, further comprising at least one antenna element coupled to the transmitter.

Example 19 is a base station, comprising: a transmitter according to any of examples 1 to 16; and modem circuitry configured to generate the baseband signal based on the information to be transmitted.

Example 20 is the base station of example 19, further comprising at least one antenna element coupled to the transmitter.

Example 21 is a method for generating a radio frequency, RF, transmit signal, comprising: generating, based on a sequence of first control words each indicating a respective frequency shift with respect to a target frequency of the RF transmit signal, a RF carrier signal with sequentially varying frequency over time in order to frequency spread the RF transmit signal; generating the RF transmit signal by modulating the RF carrier signal with a modulation control signal; and generating the modulation control signal by modifying, based on the sequence of first control words, phase information of a baseband signal bearing information to be transmitted or phase information of a signal derived from the baseband signal in order to frequency de-spread the RF transmit signal.

Example 22 is the method of example 21, wherein generating the RF carrier signal comprises: generating the RF carrier signal with phase-locked loop circuitry based on a sequence of phase-locked loop control words; generating the sequence of phase-locked loop control words by sequentially combining a second control word indicating the target frequency of the RF transmit signal with the sequence of first control words.

Example 23 is the method of example 21 or example 22, wherein a digital-to-time converter is used for modulating the RF carrier signal with the modulation control signal, and wherein the modulation control signal indicates a sequence of control words for the digital-to-time converter.

Example 24 is the method of example 23, wherein the signal derived from the baseband signal indicates an unmodified sequence of control words for the digital-to-time converter, and wherein generating the modulation control signal comprises: generating the sequence of control words for the digital-to-time converter by sequentially combining the unmodified sequence of control words for the digital-to-time converter with a sequence of shift words;

and generating the sequence of shift words by sequentially accumulating the sequence of first control words.

Example 25 is the method of example 24, further comprising: generating the unmodified sequence of control words for the digital-to-time converter based on the phase information of the baseband signal.

Example 26 is the method of example 23, wherein generating the modulation control signal comprises: sequentially modifying the phase information of the baseband signal based on the sequence of first control words; and generating the sequence of control words for the digital-to-time converter based on the modified phase information of the baseband signal.

Example 27 is the method of example 25 or example 26, further comprising: amplifying the RF transmit signal with power amplifier circuitry based on a sequence of amplification control words; and generating the sequence of amplification control words for the power amplifier circuitry based on the baseband signal.

Example 28 is the method of any of examples 23 to 27, further comprising: pre-distorting the sequence of control words for the digital-to-time converter prior to supplying it to the digital-to-time converter.

Example 29 is the method of example 21, wherein generating the modulation control signal comprises sequentially modifying the respective phase information of an in-phase component and a quadrature component of the baseband signal based on the sequence of first control words in order to generate a modified in-phase component and a modified quadrature component of the baseband signal, and wherein generating the RF transmit signal comprises: generating a first component of the RF transmit signal by modulating the RF carrier signal with the modified in-phase component of the baseband signal; generating a second component of the RF transmit signal by modulating a 90° phase shifted replica of the RF carrier signal with the modified quadrature component of the baseband signal; and generating the RF transmit signal by combining the first component of the RF transmit signal and the second component of the RF transmit signal.

Examples of the proposed technique may enable frequency spreading for carrier-shift spur reduction.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A transmitter for generating a radio frequency (RF) transmit signal, comprising:
   signal generation circuity configured to generate, based on a sequence of first control words each indicating a respective frequency shift with respect to a target frequency of the RF transmit signal, a RF carrier signal with sequentially varying frequency over time to frequency spread the RF transmit signal;
   modulation circuitry configured to generate the RF transmit signal by modulating the RF carrier signal with a modulation control signal; and
   modification circuity configured to generate the modulation control signal by modifying, based on the sequence of first control words, phase information of a baseband signal bearing information to be transmitted or phase information of a signal derived from the baseband signal to frequency de-spread the RF transmit signal.

2. The transmitter of claim 1, wherein the signal generation circuity comprises:
   phase-locked loop circuitry configured to generate the RF carrier signal based on a sequence of phase-locked loop control words; and
   combining circuitry configured to generate the sequence of phase-locked loop control words by sequentially combining a second control word indicating the target frequency of the RF transmit signal with the sequence of first control words.

3. The transmitter of claim 1, further comprising sequence generation circuitry configured to generate the sequence of first control words.

4. The transmitter of claim 1, wherein the modulation circuitry is configured to generate the RF transmit signal using polar modulation.

5. The transmitter of claim 4, wherein the transmitter is a digital transmitter.

6. The transmitter of claim 1, wherein the modulation circuitry comprises a digital-to-time converter circuit, and wherein the modulation control signal indicates a sequence of control words for the digital-to-time converter circuit.

7. The transmitter of claim 6, wherein the signal derived from the baseband signal indicates an unmodified sequence of control words for the digital-to-time converter circuit, and wherein the modification circuity comprises:
   combining circuitry configured to generate the sequence of control words for the digital-to-time converter circuit by sequentially combining the unmodified sequence of control words for the digital-to-time converter circuit with a sequence of shift words; and
   accumulator circuitry configured to generate the sequence of shift words by sequentially accumulating the sequence of first control words.

8. The transmitter of claim 7, further comprising front-end circuitry configured to generate the unmodified sequence of control words for the digital-to-time converter circuit based on the phase information of the baseband signal.

9. The transmitter of claim 8, wherein the transmitter further comprises power amplifier circuitry configured to amplify the RF transmit signal based on a sequence of amplification control words, and wherein the front-end circuitry is further configured to generate the sequence of amplification control words for the power amplifier circuitry based on the baseband signal.

10. The transmitter of claim 7, further comprising pre-distortion circuitry coupled between the modification circuity and the modulation circuitry, wherein the pre-distortion circuitry is configured to pre-distort the sequence of control words for the digital-to-time converter circuit.

11. The transmitter of claim 1, wherein the modulation circuitry comprises a digital-to-time converter circuit, wherein the modification circuity is configured to sequentially modify the phase information of the baseband signal based on the sequence of first control words to generate the modulation control signal, and wherein the transmitter further comprises front-end circuitry configured to generate a sequence of control words for the digital-to-time converter circuit based on the modulation control signal.

12. The transmitter of claim 1, wherein the modulation circuitry is configured to generate the RF transmit signal using cartesian modulation.

13. The transmitter of claim 1, wherein the modification circuity is configured to sequentially modify the respective phase information of an in-phase component and a quadrature component of the baseband signal based on the sequence of first control words to generate a modified in-phase component and a modified quadrature component of the baseband signal as the modulation control signal, and wherein the modulation circuitry comprises:
   mixer circuitry configured to:
      generate a first component of the RF transmit signal by modulating the RF carrier signal with the modified in-phase component of the baseband signal; and
      generate a second component of the RF transmit signal by modulating a 90° phase shifted replica of the RF carrier signal with the modified quadrature component of the baseband signal; and
   signal combining circuitry configured to generate the RF transmit signal by combining the first component of the RF transmit signal and the second component of the RF transmit signal.

14. The transmitter of claim 13, further comprising digital-to-analog converter circuitry coupled between the modification circuity and the modulation circuitry, wherein the digital-to-analog converter circuitry is configured to convert the modulation control signal to an analog domain.

15. The transmitter of claim 13, further comprising power amplifier circuitry configured to amplify the RF transmit signal.

16. The transmitter of claim 1, wherein the RF transmit signal is a wideband signal.

17. A mobile device, comprising:
   the transmitter according to claim 1; and modem circuitry configured to generate the baseband signal based on the information to be transmitted.

18. A base station, comprising:
the transmitter according to claim 1; and
modem circuitry configured to generate the baseband signal based on the information to be transmitted.

19. A method for generating a radio frequency (RF) transmit signal, comprising:
generating, based on a sequence of first control words each indicating a respective frequency shift with respect to a target frequency of the RF transmit signal, a RF carrier signal with sequentially varying frequency over time to frequency spread the RF transmit signal;
generating the RF transmit signal by modulating the RF carrier signal with a modulation control signal; and
generating the modulation control signal by modifying, based on the sequence of first control words, phase information of a baseband signal bearing information to be transmitted or phase information of a signal derived from the baseband signal to frequency de-spread the RF transmit signal.

20. The method of claim 19, wherein generating the RF carrier signal comprises:
generating the RF carrier signal with phase-locked loop circuitry based on a sequence of phase-locked loop control words; and
generating the sequence of phase-locked loop control words by sequentially combining a second control word indicating the target frequency of the RF transmit signal with the sequence of first control words.

21. The method of claim 19, wherein generating the RF transmit signal comprises providing a digital-to-time converter for modulating the RF carrier signal with the modulation control signal, and wherein the modulation control signal indicates a sequence of control words for the digital-to-time converter.

22. The method of claim 21, wherein the signal derived from the baseband signal indicates an unmodified sequence of control words for the digital-to-time converter, and wherein generating the modulation control signal comprises:
generating the sequence of control words for the digital-to-time converter by sequentially combining the unmodified sequence of control words for the digital-to-time converter with a sequence of shift words; and
generating the sequence of shift words by sequentially accumulating the sequence of first control words.

23. The method of claim 22, further comprising:
generating the unmodified sequence of control words for the digital-to-time converter based on the phase information of the baseband signal.

24. The method of claim 21, wherein generating the modulation control signal comprises:
sequentially modifying the phase information of the baseband signal based on the sequence of first control words; and
generating the sequence of control words for the digital-to-time converter based on the modified phase information of the baseband signal.

25. The method of claim 19, wherein generating the modulation control signal comprises sequentially modifying the respective phase information of an in-phase component and a quadrature component of the baseband signal based on the sequence of first control words to generate a modified in-phase component and a modified quadrature component of the baseband signal, and wherein generating the RF transmit signal comprises:
generating a first component of the RF transmit signal by modulating the RF carrier signal with the modified in-phase component of the baseband signal;
generating a second component of the RF transmit signal by modulating a 90° phase shifted replica of the RF carrier signal with the modified quadrature component of the baseband signal; and
generating the RF transmit signal by combining the first component of the RF transmit signal and the second component of the RF transmit signal.

* * * * *